(12) United States Patent
Udo

(10) Patent No.: US 9,638,911 B2
(45) Date of Patent: May 2, 2017

(54) AUTOFOCUS MECHANISM

(71) Applicant: MITUTOYO CORPORATION, Kanagawa (JP)

(72) Inventor: Shohei Udo, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/315,826

(22) Filed: Jun. 26, 2014

(65) Prior Publication Data
US 2015/0001373 A1 Jan. 1, 2015

(30) Foreign Application Priority Data

Jul. 1, 2013 (JP) ................................. 2013-138162

(51) Int. Cl.
*G02B 7/38* (2006.01)
*G02B 21/24* (2006.01)

(52) U.S. Cl.
CPC ............. *G02B 21/247* (2013.01); *G02B 7/38* (2013.01)

(58) Field of Classification Search
CPC .......... G02B 21/247; G02B 7/38; G02B 7/28; G02B 21/24; G02B 21/244
USPC ........ 250/201.1, 201.2, 201.3, 201.4, 214 A, 250/214 LA, 214 AG; 330/69, 73, 295
See application file for complete search history.

(56) References Cited

U.S. PATENT DOCUMENTS

| | | |
|---|---|---|
| 4,311,904 A | 1/1982 | Okada et al. |
| 4,625,103 A | 11/1986 | Kitamura et al. |
| 5,471,046 A * | 11/1995 | Meyers ..................... G02B 7/28 250/201.4 |
| 2005/0133692 A1* | 6/2005 | Watanabe ............ G02B 21/008 250/214 A |
| 2006/0146664 A1* | 7/2006 | Van Brocklin ...... G11B 7/0037 369/44.27 |

FOREIGN PATENT DOCUMENTS

JP 07-105547 A 4/1995

OTHER PUBLICATIONS

U.S. Appl. No. 14/315,876 to Shohei Udo, filed Jun. 26, 2014.
Search report from E.P.O., mail date is Oct. 29, 2014.

* cited by examiner

Primary Examiner — Francis M. Legasse, Jr.
Assistant Examiner — Don Williams
(74) Attorney, Agent, or Firm — Greenblum & Bernstein, P.L.C.

(57) ABSTRACT

An autofocus mechanism includes a light source emitting light through an objective lens at a work piece; a first detector detecting a portion of light reflected by the work piece and generating a first signal; a second detector detecting a portion of the reflected light and generating a second signal; a first amplifier amplifying the first signal and generating a first amplified signal; a second amplifier amplifying the second signal and generating a second amplified signal; an amplification rate definer defining an amplification rate of each of the first amplifier and the second amplifier based on the first amplified signal and the second amplified signal, respectively; and a calculator identifying a focal position of the objective lens based on the first amplified signal and the second amplified signal.

1 Claim, 4 Drawing Sheets

AUTOFOCUS MECHANISM

CROSS-REFERENCE TO RELATED APPLICATIONS

The present application claims priority under 35 U.S.C. §119 of Japanese Application No. 2013-138162, filed on Jul. 1, 2013, the disclosure of which is expressly incorporated by reference herein in its entirety.

BACKGROUND OF THE INVENTION

1. Field of the Invention

The present invention relates to an autofocus mechanism adjusting a focal position with respect to a work piece.

2. Description of Related Art

Conventionally, an autofocus mechanism used in a measurement device is known (see Japanese Patent Laid-open Publication No. H07-105547). The autofocus mechanism uses a method of emitting light at a work piece and identifying a focal position based on light reflected by the work piece. Specifically, the reflected light received by a photodiode is converted to an electric signal. Then, the electric signal is amplified by an amplifier and the focal position is identified based on the amplified signals.

However, in a case where reflectance of the work piece is low, the amplified signals obtained in the autofocus mechanism are small. Thus, when electronic noise is present in the amplified signals, identification of the focal position becomes difficult. Specifically, accuracy of the autofocus is reduced. Moreover, feedback control, which tracks a surface of the work piece based on the focal position, cannot be performed stably.

SUMMARY OF THE INVENTION

The present invention provides an autofocus mechanism with improved accuracy in identifying a focal position.

An autofocus mechanism according to the present invention includes a light source emitting light through an objective lens at a work piece; a first detector detecting a portion of light reflected by the work piece and generating a first signal; a second detector detecting a portion of the reflected light and generating a second signal; a first amplifier amplifying the first signal and generating a first amplified signal; a second amplifier amplifying the second signal and generating a second amplified signal; an amplification rate definer defining an amplification rate of each of the first amplifier and the second amplifier based on the first amplified signal and the second amplified signal, respectively; and a calculator identifying a focal position of the objective lens based on the first amplified signal and the second amplified signal.

According to the present invention, the amplification rate of each of the first amplifier and the second amplifier is defined based on the first amplified signal and the second amplified signal. Therefore, even when reflectance of the work piece is low, deterioration of the first and second amplified signals can be inhibited. The present invention thus provides an autofocus mechanism with improved accuracy in identifying a focal position.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
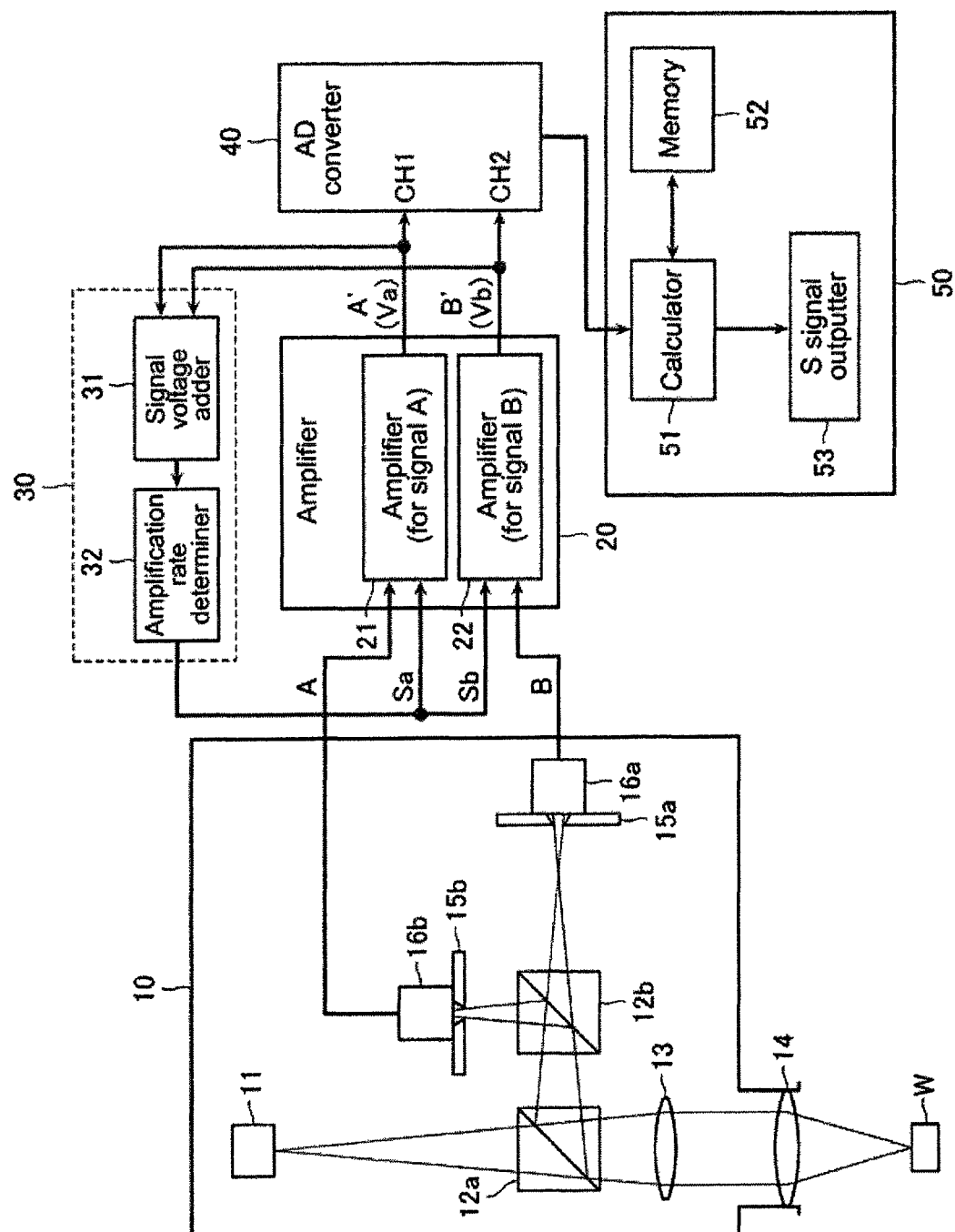
FIG. 1 is a schematic view illustrating a configuration of an autofocus mechanism according to a first embodiment.

FIG. 1 is a schematic view illustrating a configuration of an autofocus mechanism according to a first embodiment. The autofocus mechanism according to the present embodiment is a laser autofocus mechanism using a so-called double pinhole method, and is installed in optical devices such as a microscope and an image measuring instrument, for example.

As shown in FIG. 1, the autofocus mechanism according to the present embodiment includes an optical head 10, an amplifier 20, an amplification rate definer 30, an AD converter 40, and a computer 50. The optical head 10 emits laser light at a work piece W, receives the light reflected by the work piece W, and converts the reflected light into an electric signal. The amplifier 20 amplifies the electric signal received from the optical head 10. The amplification rate definer 30 defines an amplification rate of the amplifier 20 based on the electric signal received from the amplifier 20. The AD converter 40 converts the electric signal received from the amplifier 20 from an analog signal into a digital signal. The computer 50 identifies a focal position based on the signal received from the AD converter 40.

As shown in FIG. 1, in the optical head 10, a light source (laser diode) 11 emits laser light, which is emitted at a beam splitter 12a. The beam splitter 12a allows light from the light source 11 to pass and bombard a tube lens 13, and reflects the light reflected by the work piece W onto a beam splitter 12b.

The tube lens 13 converts the light from the beam splitter 12a into parallel light, which is emitted through an objective lens 14 at the work piece W. In addition, the tube lens 13 allows the light reflected by the work piece W to bombard the beam splitter 12a. The beam splitter 12b scatters the light from the beam splitter 12a and allows transmitted light to bombard, through a pinhole 15a, a photoreceiver element (photodiode) 16a. In addition, the beam splitter 12b allows reflected light to bombard, through a pinhole 15b, a photoreceiver element (photodiode) 16b. The photoreceiver elements 16a and 16b output a signal A and a signal B, respectively, to the amplifier 20 based on an amount of light received.

In FIG. 1, when the optical head 10 (objective lens 14) is arranged in the focal position with respect to the work piece W, output of the photoreceiver elements 16a and 16b is equal. When the optical head 10 is arranged so as to be further away from the work piece W than is the focal position, the output of the photoreceiver element 16b is greater than the output of the photoreceiver element 16a. Meanwhile, when the optical head 10 is arranged so as to be closer to the work piece W than is the focal position, the output of the photoreceiver element 16b is less than the output of the photoreceiver element 16a. Making use of such changes, the present embodiment can identify the focal position of the optical head 10 (objective lens 14) with respect to the work piece W.

As shown in FIG. 1, the amplifier 20 includes an amplifier 21 for the signal A and an amplifier 22 for the signal B. The amplifier 21 outputs an amplified signal A' (voltage value Va), which is an amplification of the signal A, to a channel CH1 of the AD converter 40. The amplifier 22 outputs an amplified signal B' (voltage value Vb), which is an amplification of the signal B, to a channel CH2 of the AD converter 40.

As shown in FIG. 1, the amplification rate definer 30 includes a signal voltage adder 31 and an amplification rate determiner 32. The signal voltage adder 31 adds the voltage value Va of the signal A' and the voltage value Vb of the signal B' (Va+Vb). The amplification rate determiner 32 determines the amplification rate of each of the amplifiers 21 and 22 such that the added value Va+Vb is a constant value. Specifically, the amplification rate determiner 32 inputs amplification rate control signals Sa and Sb to the amplifiers 21 and 22, respectively, to control the amplification rate of each. The amplification rates of the amplifiers 21 and 22 are the same. Moreover, the amplification rate control signals Sa and Sb may be either one of analog signals and digital signals.

The AD converter 40 converts the amplified signals A' and B' from analog signals into digital signals and outputs the converted signals to the computer 50.

Figure 2:
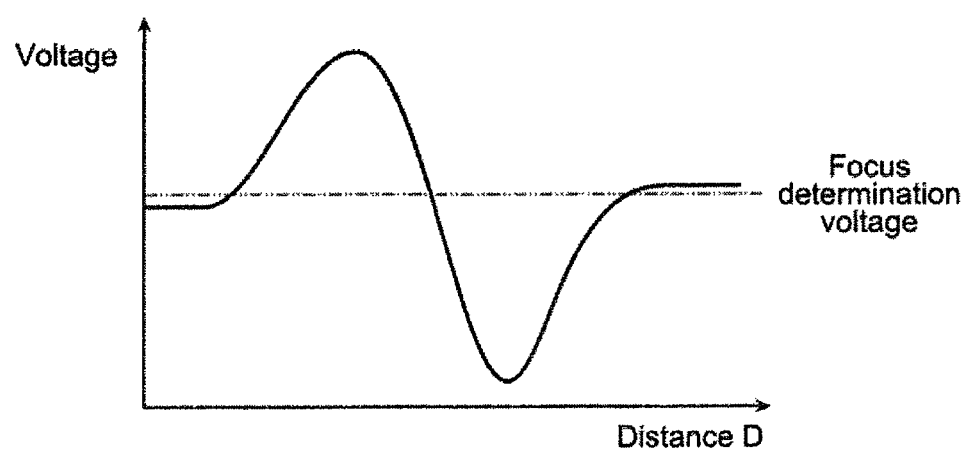
FIG. 2 illustrates an S signal.

As shown in FIG. 1, the computer 50 includes a calculator 51, a memory 52, and an S signal outputter 53. The calculator 51 calculates the S signal based on the signals A' and B' input from the AD converter 40. Herein, the S signal is a signal identifying the focal position of the objective lens 14 with respect to the work piece W. Specifically, the S signal is calculated based on [S signal=(A'−B')÷(A'+B')]. FIG. 2 illustrates the S signal. As shown in FIG. 2, the voltage value of the S signal changes according to a distance D between the optical head 10 and the work piece W. In addition, when the voltage value of the S signal matches a focus determination voltage, a determination is made that the optical head 10 (objective lens 14) is in the focal position with respect to the work piece W.

The memory 52 stores programs and also various kinds of information. The S signal outputter 53 outputs the S signal to an exterior. For example, the S signal outputter 53 converts a digital signal to an analog signal and outputs the signal. Further, the S signal outputter 53 outputs serial or parallel digital signals, for example.

Next, an advantage of the present embodiment is described in comparison to a comparative example. The amplification rate of each of the amplifiers 21 and 22 is a fixed value in the comparative example. In the comparative example of this kind, when the reflectance of the work piece W is low, the obtained amplified signals A' and B' are small. Therefore, a value (AD value) digitized by the AD converter 40 is also small. In an S signal calculation formula, an amount of change (sensitivity) of a calculated value of the S signal when the AD value is changed by 1 differs between cases where the AD value is small and cases where it is large.

For example, in a case where the AD value of the amplified signal A' is 600 and the AD value of the amplified signal B' is 300 with a high-reflectance work piece W, the calculated value of the S signal is 0.333. Further, in a case where the AD value of the amplified signal A' is 600 and the AD value of the amplified signal B' is changed by only −1 to be 299, the calculated value of the S signal is 0.334. In this case, a difference in the S signal value before and after the change to the amplified signal B' is 0.001.

Meanwhile, in a case where the AD value of the amplified signal A' is 6 and the AD value of the amplified signal B' is 3 with a low-reflectance work piece W, the calculated value of the S signal is 0.333. Further, in a case where the AD value of the amplified signal A' is 6 and the AD value of the amplified signal B' is similarly changed by only −1 to be 2, the calculated value of the S signal is 0.5. In this case, the difference in the S signal value before and after the change to the amplified signal B' is 0.167. Accordingly, the S signal value relative to the change of −1 in the amplified signal B' changes more greatly when the low-reflectance work piece W is used than when the high-reflectance work piece W is used.

As noted above, with the low-reflectance work piece W, the S signal value changes greatly with even a slight change to the signals A and B, and thus the S signal varies greatly due to electronic noise. Alternatively, the S signal is highly sensitive to changes in the signals A and B, and thus varies greatly. Similar detrimental effects occur even in a case where amplification is performed by switching between circuits having fixed amplification rates because there are cases where the AD value is small in a single amplification path.

In contrast, in the present embodiment, the amplification rate of each of the amplifiers 21 and 22 is defined based on voltage values Va and Vb of the amplified signals A' and B', respectively. Accordingly, even when the reflectance of the work piece W is low, the amplified signals A' and B' are not small and the AD value ordinarily obtained is a large value, in comparison to the comparative example. Therefore, variation in the S signal caused by electronic noise and sensitivity can be reduced more than in the comparative example. Accordingly, the present embodiment can increase the accuracy of identifying the focal position, in comparison to the comparative example.

Second Embodiment

Figure 3:
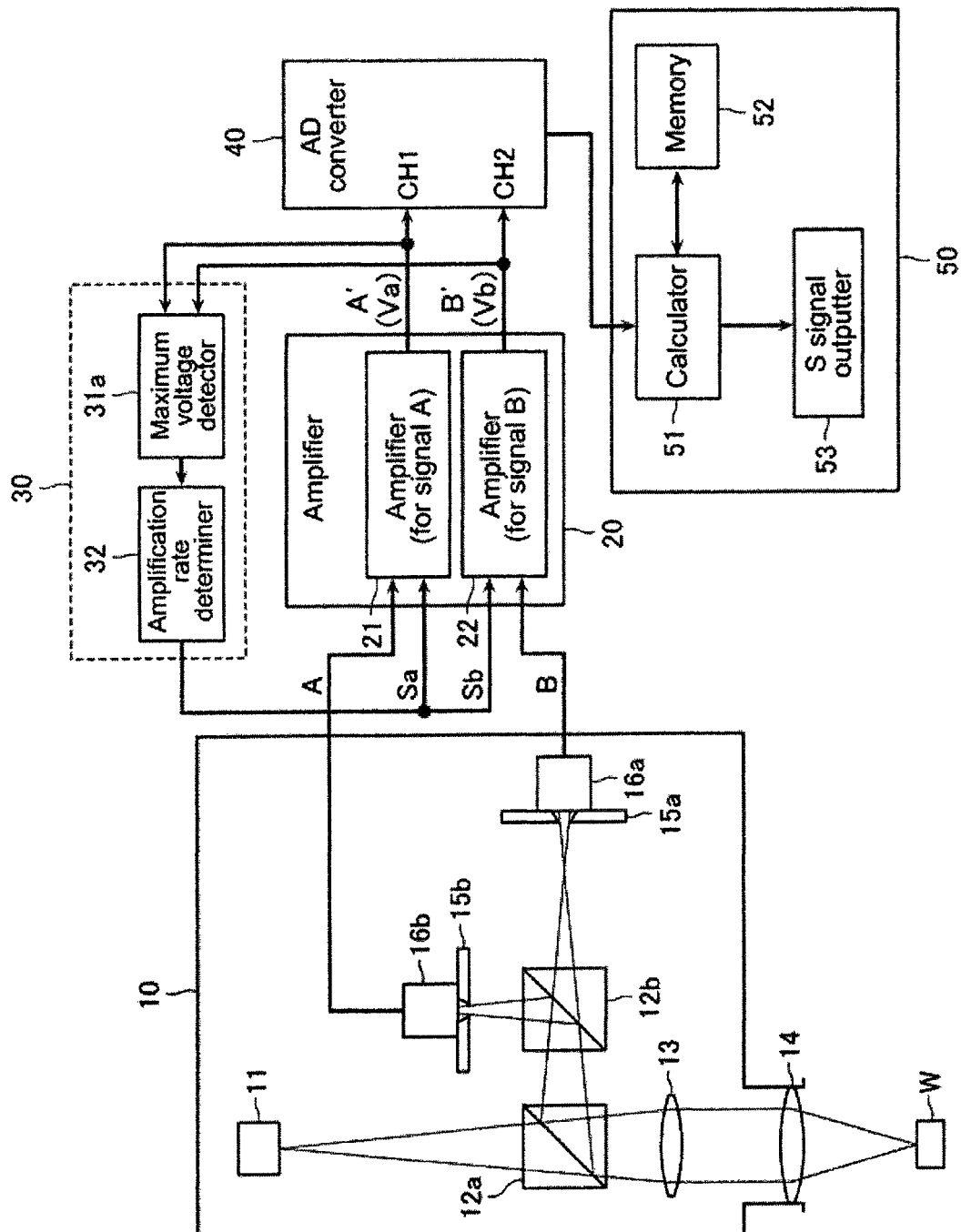
FIG. 3 is a schematic view illustrating a configuration of an autofocus mechanism according to a second embodiment.

Next, an autofocus mechanism according to a second embodiment is described with reference to FIG. 3. As shown in FIG. 3, the second embodiment includes a maximum voltage detector 31a instead of the signal voltage adder 31. The second embodiment differs from the first embodiment in this respect.

The maximum voltage detector 31a detects the higher voltage value of the voltage value Va of the signal A' and the voltage value Vb of the signal B'. The amplification rate determiner 32 defines the amplification rate of each of the amplifiers 21 and 22 such that the detected higher voltage value is a constant voltage.

The second embodiment having the above-described configuration achieves a similar effect to that of the first embodiment. Furthermore, in the first embodiment, there is a possibility that one of the amplified signals A' and B' may be larger than a range enabling digitization by the AD converter 40. Meanwhile, in the second embodiment, the amplified signals A' and B' can be kept within the range enabling digitization by the AD converter 40, using the above-noted configuration.

Third Embodiment

Next, an autofocus mechanism according to a third embodiment is described with reference to FIG. 4. The autofocus mechanism according to the present embodiment is a laser autofocus mechanism using a double knife-edge method.

Figure 4:
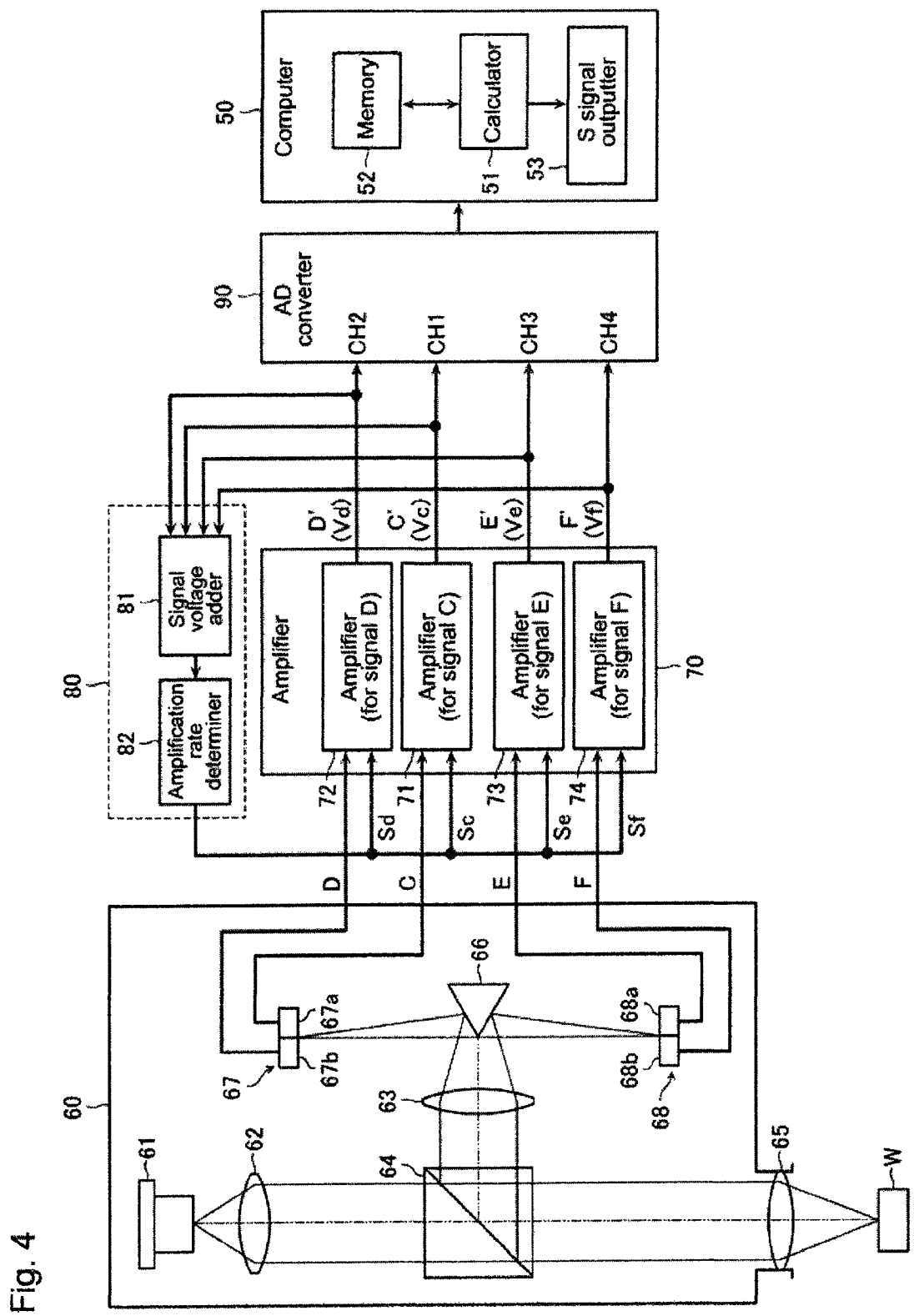
FIG. 4 is a schematic view illustrating a configuration of an autofocus mechanism according to a third embodiment.

As shown in FIG. 4, the autofocus mechanism according to the present embodiment includes an optical head 60, an amplifier 70, an amplification rate definer 80, an AD converter 90, and the computer 50.

As shown in FIG. 4, in the optical head 60, a light source (laser diode) 61 emits laser light, which traverses a tube lens 62 and a beam splitter 64 to pass through an objective lens 65, and is emitted at the work piece W. A beam of light that has passed through the objective lens 65 forms a light point image at the focal position of the objective lens 65. FIG. 4 illustrates an exemplary case where the focal position of the objective lens 65 is matched to the work piece W. The light reflected by the work piece W passes through the objective lens 65, is reflected by the beam splitter 64, passes through an auxiliary lens 63, and is guided to a triangular prism 66.

Of the light split by the triangular prism 66, a first portion forms a light point image on a halved sensor 67, which is configured by halved photoreceiver elements 67a and 67b. A second portion of the light forms a light point image on a halved sensor 68, which is configured by halved photoreceiver elements 68a and 68b.

In the present embodiment, when relative positions of the work piece W and the optical head 60 change in an optical axis direction of the objective lens 65 and the work piece W deviates from the focal position of the objective lens 65, the light point image on the halved sensor 67 becomes blurry. When the optical head 60 (objective lens 65) is closer to the work piece W than is the focal position, the amount of light received by the photoreceiver elements 67a and 68a increases. Meanwhile, when the optical head 60 (objective lens 65) is further away from the work piece W than is the focal position, the amount of light received by the photoreceiver elements 67b and 68b increases. Making use of such changes, the present embodiment can identify the focal position of the optical head 60 (objective lens 65) with respect to the work piece W. Moreover, the photoreceiver elements 67a and 67b output a signal C and a signal D, respectively, based on the amount of light received. The photoreceiver elements 68a and 68b output a signal E and a signal F, respectively, based on the amount of light received.

As shown in FIG. 4, the amplifier 70 includes an amplifier 71 for the signal C, an amplifier 72 for the signal D, an amplifier 73 for the signal E, and an amplifier 74 for the signal F.

The amplifier 71 outputs an amplified signal C' (voltage value Vc), which is an amplification of the signal C, to a channel CH1 of the AD converter 90. The amplifier 72 outputs an amplified signal D' (voltage value Vd), which is an amplification of the signal D, to a channel CH2 of the AD converter 90. The amplifier 73 outputs an amplified signal E' (voltage value Ve), which is an amplification of the signal E, to a channel CH3 of the AD converter 90. The amplifier 74 outputs an amplified signal F' (voltage value Vf), which is an amplification of the signal F, to a channel CH4 of the AD converter 90.

As shown in FIG. 4, the amplification rate definer 80 includes a signal voltage adder 81 and an amplification rate determiner 82. The signal voltage adder 81 adds the voltage value Vc of the signal C', the voltage value Vd of the signal D', the voltage value Ve of the signal E', and the voltage value Vf of the signal F' (Vc+Vd+Ve+Vf). The amplification rate determiner 82 determines the amplification rate of each of the amplifiers 71 to 74 such that the added value Vc+Vd+Ve+Vf is a constant value. Specifically, the amplification rate determiner 82 inputs amplification rate control signals Sc through Sf to the amplifiers 71 through 74, respectively, to control the amplification rate of each. The amplification rates of the amplifiers 71 to 74 are all the same. Moreover, the amplification rate control signals Sc to Sf may be either one of analog signals and digital signals.

The AD converter 90 converts the amplified signals C', D', E' and F' from analog signals into digital signals and outputs the converted signals to the computer 50.

The computer 50 has a configuration substantially similar to that of the first embodiment. However, calculation of the S signal by the calculator 51 according to the third embodiment is different from that of the first embodiment. Specifically, the S signal is calculated based on [S signal=(C'−D')÷(C'+D')+(E'−F')÷(E'+F')]. The third embodiment, with the configuration described above, achieves a similar effect to that of the first embodiment.

Embodiments of the present invention were described above, but the present invention is not limited to these and can include various modifications, additions, and the like not deviating from the scope of the present invention. For example, in the third embodiment, the double knife-edge method was applied to the first embodiment. However, the double knife-edge method according to the third embodiment can also be applied to the second embodiment, as well.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An autofocus mechanism comprising:
a light source configured to emit light through an objective lens onto a work piece;
a first detector configured to detect a first portion of the light reflected by the work piece and generate a first signal;
a second detector configured to detect a second portion of the reflected light and generate a second signal;
a first amplifier configured to amplify the first signal and generate a first amplified signal;
a second amplifier configured to amplify the second signal and generate a second amplified signal;
an amplification rate definer comprising:

a signal voltage adder configured to add a voltage value corresponding to the first amplified signal of the first amplifier and a voltage value corresponding to the second amplified signal of the second amplifier, to obtain an added voltage value; and an amplification rate determiner configured to control and define an amplification rate of each of the first amplifier and the second amplifier based on the added voltage value, such that the added voltage value is a constant value; and a calculator configured to calculate a focal position signal to identify a focal position of the objective lens, based on the first amplified signal and the second amplified signal, a voltage value of the focal position signal varying according to a distance between the objective lens and the work piece.

* * * * *